(12) United States Patent
Chung et al.

(10) Patent No.: US 8,497,040 B2
(45) Date of Patent: Jul. 30, 2013

(54) LITHIUM SECONDARY BATTERY WITH HIGH ENERGY DENSITY

(75) Inventors: Geun-Chang Chung, Daejeon (KR); Dong Seok Shin, Daejeon (KR); Sun Kyu Kim, Seongnam-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/304,829

(22) Filed: Nov. 28, 2011

(65) Prior Publication Data

US 2012/0070742 A1    Mar. 22, 2012

Related U.S. Application Data

(60) Division of application No. 12/829,116, filed on Jul. 1, 2010, now abandoned, which is a continuation of application No. PCT/KR2010/003313, filed on May 26, 2010.

(30) Foreign Application Priority Data

May 26, 2009 (KR) .................. 10-2009-0045776

(51) Int. Cl.
*H01M 10/052* (2010.01)
*H01M 4/40* (2006.01)
*H01M 4/48* (2010.01)

(52) U.S. Cl.
USPC .................. 429/231.95; 429/231.5

(58) Field of Classification Search
USPC .................. 429/224, 231.5, 231.95
See application file for complete search history.

(56) References Cited

U.S. PATENT DOCUMENTS

| | | | |
|---|---|---|---|
| 5,130,211 A | 7/1992 | Wilkinson et al. | |
| 6,706,447 B2 | 3/2004 | Gao et al. | |
| 6,761,744 B1 | 7/2004 | Tsukamoto et al. | |
| 7,575,830 B2 | 8/2009 | Kawamura et al. | |
| 2004/0048157 A1* | 3/2004 | Neudecker et al. | 429/231.2 |
| 2007/0015056 A1* | 1/2007 | Takei et al. | 429/231.8 |
| 2007/0190416 A1 | 8/2007 | Yamada et al. | |
| 2008/0057396 A1 | 3/2008 | Fujihara et al. | |
| 2008/0070120 A1* | 3/2008 | Miyawaki et al. | 429/231.95 |
| 2008/0081260 A1* | 4/2008 | Yamamoto et al. | 429/221 |
| 2009/0017377 A1* | 1/2009 | Kogetsu et al. | 429/209 |

FOREIGN PATENT DOCUMENTS

| | | |
|---|---|---|
| JP | 6-36798 A | 2/1994 |
| JP | 2000-182602 A | 6/2000 |
| JP | 2000-228196 A | 8/2000 |
| JP | 2004-200003 A | 7/2004 |
| JP | 2005-38720 A | 2/2005 |
| JP | 2005-190982 A | 7/2005 |
| JP | 2007-305596 A | 11/2007 |
| KR | 10-2001-0081928 A | 8/2001 |
| KR | 10-0332269 B1 | 3/2002 |
| KR | 10-2004-0040411 A | 5/2004 |
| KR | 10-2005-0030588 A | 3/2005 |
| KR | 10-2005-0104625 A | 11/2005 |
| KR | 10-0581814 B1 | 5/2006 |
| KR | 10-2006-0080454 A | 7/2006 |
| KR | 10-2006-0111393 A | 10/2006 |
| KR | 10-2009-0066019 A | 6/2009 |

* cited by examiner

*Primary Examiner* — Gregg Cantelmo
(74) *Attorney, Agent, or Firm* — Birch Stewart Kolasch & Birch, LLP

(57) ABSTRACT

The present invention relates to electrodes for a lithium secondary battery with a high energy density and a secondary battery with a high energy density using the same. A negative electrode includes a material which can be alloyed with lithium alloy. A positive electrode is made of a transition metal oxide which can reversibly intercalate or deintercalate lithium. Here, the entire reversible lithium storage capacity of the positive electrode is greater than the capacity of lithium dischargeable from the positive electrode.

9 Claims, 1 Drawing Sheet

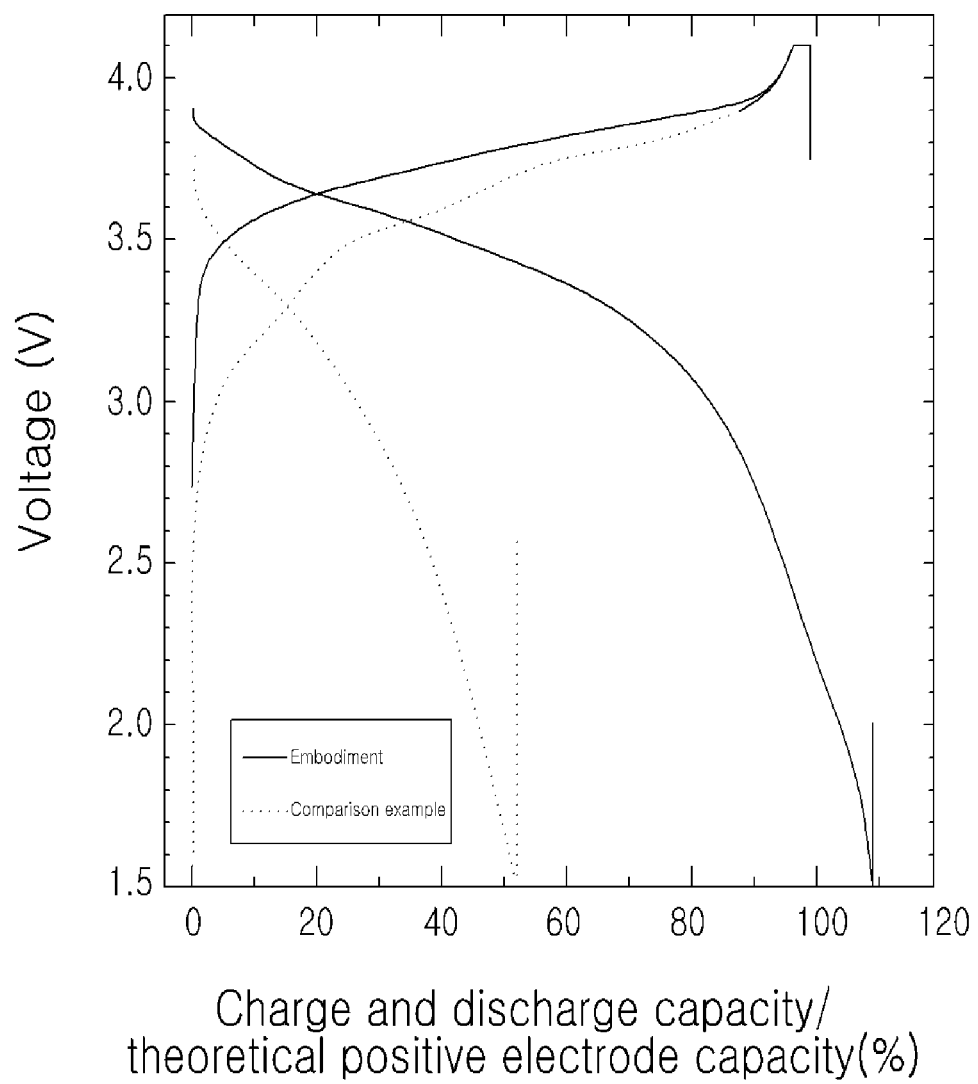

LITHIUM SECONDARY BATTERY WITH HIGH ENERGY DENSITY

This application is a Divisional of U.S. patent application Ser. No. 12/829,116, filed Jul. 1, 2010, now abandoned, which is a continuation of PCT/KR2010/003313 filed on May 26, 2010. This application also claims priority to Korean Application No. 10-2009-0045776, filed in Korea on May 26, 2009. The entire contents of the above mentioned applications are hereby incorporated by reference.

BACKGROUND OF THE INVENTION

1. Field of the Invention

The present invention relates to a lithium secondary battery with a high energy density and, more particularly, to a lithium secondary battery with metal lithium coated on the electrode surface of a negative electrode or a positive electrode or both, in which the negative electrode includes a material which can be alloyed with lithium and having a capacity per unit weight of 700 mAh/g to 4300 mAh/g, the positive electrode is made of a transition metal oxide capable of reversibly intercalating and deintercalating lithium, and the entire reversible lithium storage capacity is included in the positive electrode (i.e., when the battery is fabricated, the entire reversible lithium storage capacity is included in the positive electrode and greater than a lithium capacity dischargeable in an available voltage range), and lithium of a metal form does not remain in the negative electrode and the positive electrode after an initial activation charge.

2. Discussion of the Related Art

In order to spread environment-friendly vehicles, the development of electric power for the vehicles is being accelerated. Important requirements for the spread of the electric vehicles include the price per energy, energy per weight, safety, and durability. Today, development centers on a lithium secondary battery having excellent durability and a long life span, but there is an epoch-making improvement for the price per energy and energy per weight. To this end, a focus is concentrated on a lithium alloy material including a large amount of lithium per unit weight and elements capable of forming an alloy, such as aluminum (Al), tin (Sn), and silicon (Si), in order to form a negative electrode of a high capacity. However, the material is problematic in that the loss of an initial irreversible capacity is great.

Meanwhile, in order to improve the energy density of the lithium secondary battery, a technique for increasing the capacity of a positive electrode material is being developed. In particular, an Li(Ni, Co, Al)$O_2$ material or an Li(Ni, Co, Mn)$O_2$ material with stabilized LiNi$O_2$ has an advantage in that they can greatly increase the capacity of the lithium secondary battery because they have a high reversible capacity per unit weight. However, the material is problematic in that it has a great reaction with an electrolyte in the full charge state because it needs to be charged with a high voltage in order to achieve a high capacity characteristic. Accordingly, the material has a serious aging characteristic in the life span according to a long-term storage or cycle. Further, a battery using the material is insufficient in the safety of a unit cell when the capacity of the unit cell is increased and thus problematic in that thermal runaway and ignition are generated when being overcharged or stored in a hot box of 150° C.

In order to overcome the above problems and achieve a higher capacity, PCT 2006/112674 provides a lithium secondary battery using an active material, not including lithium, for a positive electrode and a lithium transition metal oxide with a high irreversible lithium capacity. The lithium secondary battery of this patent can be made with a higher capacity because a transition metal oxide, not including lithium, for the positive electrode with a high capacity can be used. Further, the lithium secondary battery is excellent in the safety and long-term durability because voltage when the battery is fully charged is not high. The lithium secondary battery, however, has a drawback in that most of the transition metal oxide (i.e., an inactive solid compound) remains within the battery after lithium is used, thereby deteriorating the energy density, because the lithium important to increase the capacity is stored in an initial lithium transition metal oxide.

As a scheme for providing sufficient lithium and also significantly increasing the energy density per weight, research becomes active on a battery using metal lithium. For example, in order to improve a dendrite problem according to charge and discharge, PCT/JP2004/007877 proposes a negative electrode for a lithium metal secondary battery in which metal lithium is deposited on an insulating base and an inorganic solid electrolyte film is formed on the metal lithium. Meanwhile, U.S. Pat. No. 7,247,408 proposes a lithium metal electrode coated with multiple layers of a single one conductive layer and a polymer layer in order to inhibit the formation of lithium dendrite. Further, in order to further increase the surface processing effect and also effectively form a thin metal lithium film, Korean Patent No. 10-0496306 proposes a method of forming a metaplasia film on a base, forming a current collector on the metaplasia film, and lithium metal is deposited on the current collector, thereby being capable of reducing a spatial loss due to the base film, suppressing deformation resulting from heat, and obtaining a deposition lithium layer with a high degree of purity. However, the above methods can steadily increase reversibility according to lithium charge and discharge, but is problematic in that it does not fundamentally prevent ignition and explosion resulting from metal lithium when the battery is used in abnormal environments or the battery is overheated upon misuse.

Meanwhile, a technique for previously doping metal lithium and fully consuming the doped metal lithium through activation has recently been applied to a lithium ion capacitor. In this case, the initially inserted lithium is compressed into the surface of an electrode in the form of a lithium metal plate or a lithium metal electrode is inserted into a third electrode and then electrochemically doped on a lithium storage electrode. For example, Japanese Unexamined Patent Application Publication No. Hei8-107048 provides a method of sealing the carbon electrode of an electric dual layer capacitor with a metal foil physically brought into contact with the surface of the carbon electrode and chemically doping lithium on the carbon electrode while raising temperature. However, this patent is problematic in that lithium metal difficult to mechanically handle must be used in order to dope only a necessary amount of lithium (i.e., very thin within 5 to 20 micron) on a common capacitor or a lithium battery. Further, this patent has a difficulty in that if this patent is applied to a capacitor or battery with a high capacity and a wide electrode area, the thin metal lithium foil must be adhered to the wide area. As yet another example, WO98/33227 provides a technique for introducing practically applicable metal lithium into a third electrode and doping lithium on a carbon negative electrode by electrochemically dissociating lithium from the third electrode. However, in order to uniformly dope lithium ions on the carbon negative electrode having a wide area, a current collector having holes through which the lithium ions can freely penetrate in forming negative electrode and positive electrode plates must be used. If the current collector having holes is used, there are problems in that the mechanical strength of the electrode is weakened and a process of manufacturing the electrode is complicated as compared with a case in which a uniform metallic foil current collector with no hole is used.

SUMMARY OF THE INVENTION

It is, therefore, an object of the present invention to provide a lithium secondary battery which is capable of solving a danger according to the use of metal lithium and also has a high energy density of the same degree as a metal lithium battery.

A method of previously doping metal lithium on a lithium secondary battery and then fully consuming the doped metal lithium in a process of activating the battery is used. Accordingly, the capacity of the battery can be increased and at the same time, dangers resulting from metal lithium, such as explosion, can be solved. In other words, in the battery of the present invention, the lithium storage and discharge ability of negative electrode and positive electrode materials included in the battery is utilized to the maximum extent. Accordingly, a reversible capacity after activation can be significantly increased, and metal lithium during the activation can be fully consumed, thereby being capable of avoiding a danger of metal lithium.

In accordance with an aspect of the present invention, there is provided a lithium secondary battery, comprising a negative electrode made of a material which can be alloyed with lithium, a positive electrode made of a transition metal oxide capable of reversibly intercalating and deintercalating lithium and configured to have an entire reversible lithium storage capacity greater than a lithium capacity dischargeable from the positive electrode, and a lithium layer formed on a surface of the negative electrode or the positive electrode or both.

The lithium layer satisfies an Equation below.

$$S<L \leq S+I$$

where S=a lithium storage capacity of the positive electrode−a capacity of lithium initially included in the positive electrode, L is an amount of lithium within the lithium layer, and I is an initial irreversible consumption capacity in the negative electrode.

Further, after the lithium secondary battery is initially activated and charged, lithium of a metal form does not remain in the electrode surface.

Further, the material which can be alloyed with lithium has a capacity per unit weight of 700 mAh/g to 4300 mAh/g.

Further, the lithium layer is formed using a method of compressing a metal foil on the electrode surface, a method of depositing metal lithium on the electrode surface, or a method of dispersing and coating particles, including an excessive amount of metal lithium, together with a specific binder polymer on the electrode surface.

Further, the lithium layer has weight per unit area is 0.3 mg/cm$^2$ to 0.8 mg/cm$^2$.

Further, the material which can be alloyed with lithium includes one or more selected from a group comprising Si, Sn, and Al; an alloy in which the atomic fraction of the element(s) is 50% or more; or an oxide of them.

Further, an initial irreversible capacity of the negative electrode is 40% or less of a reversible capacity.

Further, the transition metal oxide includes one or more selected from a group comprising $MnO_2$, $MoO_3$, $VO_2$, $V_2O_5$, $V_6O_{13}$, $Cr_3O_8$, and $CrO_2$.

In accordance with another aspect of the present invention, there is provided a negative electrode for a lithium secondary battery, comprising a current collection plate, a active material layer for the negative electrode, included in one or both sides of the current collection plate and made of a material which can be alloyed with lithium having a capacity per unit weight of 700 mAh/g to 4300 mAh/g, and a lithium layer formed on the active material layer.

In accordance with yet another aspect of the present invention, there is provided a positive electrode for a lithium secondary battery, comprising a current collection plate, an active material layer for the positive electrode, included in one or both sides of the current collection plate and made of a transition metal oxide, not including lithium and enabling lithium intercalation and deintercalation, a transition metal oxide including lithium, or a mixture of them, and a lithium layer formed on the active material layer.

The positive electrode of claim 12, wherein the lithium layer satisfies an Equation below.

$$S<L \leq S+I$$

where S=a lithium storage capacity of the positive electrode−a capacity of lithium initially included in the positive electrode, L is an amount of lithium within the lithium layer, and I is an initial irreversible consumption capacity in a negative electrode.

In accordance with further yet another aspect of the present invention, there is provided a method of manufacturing electrodes for a lithium secondary battery, comprising the step of forming a lithium layer using a method of coating an electrode active material on an electrode current collection plate and compressing a metal foil on the electrode active material, a method of depositing metal lithium, or a method of dispersing and coating particles, including an excessive amount of metal lithium, together with a binder polymer.

BRIEF DESCRIPTION OF THE DRAWINGS

The above and other objects and features of the present invention will become apparent from the following description of an embodiment given in conjunction with the accompanying drawing, in which:

FIG. 1 is a diagram showing a comparison of the charge and discharge capacities of batteries, fabricated according to an embodiment and a comparison example, and a theoretical positive electrode capacity (a theoretical initial lithium discharge capacity of a positive electrode).

DETAILED DESCRIPTION OF THE EMBODIMENTS

Hereinafter, an embodiment of the present invention will be described in detail with reference to the accompanying drawing so that it can be readily implemented by those skilled in the art.

In accordance with an embodiment of the present invention, a negative electrode includes materials which permit a lithium alloy and have a capacity per unit weight of 700 mAh/g to 4300 mAh/g. A positive electrode is made of a transition metal oxide which can reversibly intercalate and deintercalate lithium and has the entire reversible lithium storage capacity greater than an initially included (initially stored, but dischargeable) lithium capacity. Here, lithium metal having a capacity greater than a difference S between the reversible lithium storage capacity and the included lithium capacity of the positive electrode and equal to or smaller than the sum of the difference S and an initial irreversible capacity loss L in the negative electrode, is coated on a surface of the negative electrode or the positive electrode or both in the form of lithium metal.

$S < L \leq S+I$ where S=the lithium storage capacity of the positive electrode−the capacity of lithium initially included in the positive electrode, L is the amount of lithium within a lithium layer, and I is an initial irreversible consumption capacity in the negative electrode.

In other words, lithium metal having a capacity, greater than a difference between a lithium storage capacity and an included lithium capacity of the positive electrode and equal to or smaller than the sum of the difference and an initial irreversible capacity loss in the negative electrode, is supplied. Accordingly, the storage and discharge capacity of lithium within the active material included in the lithium secondary battery can be exhibited to the maximum extent. Consequently, the capacity of the lithium secondary battery can be significantly increased, and metal lithium is fully absorbed by materials in the form of ions after being activated, thereby being capable of achieving excellent safety.

Further, in the lithium secondary battery, the lithium metal coated on the surface of the negative electrode, the positive electrode or both is fully consumed in an initial activation charge process of the lithium secondary battery. Thereafter, lithium of a metal form does not remain on the electrode surface.

The present invention provides a lithium secondary battery which can significantly increase a reversible capacity after activation by utilizing the lithium storage and discharge ability of the negative and positive electrode materials, included in the battery, to the maximum extent and can avoid a danger of metal lithium by fully consuming the metal lithium during activation, and a method of maximizing an effect of introducing lithium into the lithium secondary battery.

A method of previously doping the metal lithium can include a method of utilizing a metal foil, a method of depositing the metal lithium, or a method of dispersing and coating particles, including an excessive amount of metal lithium, together with a specific binder polymer. In the present invention, in particular, a method of spraying the metal lithium or coating the metal lithium using a continuous roll process, such as rolling, is used. Accordingly, the present invention provides a method of manufacturing electrodes for a lithium secondary battery by directly forming a metal lithium layer on a surface of an electrode plate coated with the active material.

In the lithium secondary battery of the present invention, a metallic current collection plate, such as copper (Cu), which is used as the negative electrode is coated with a negative electrode active material and a mixed layer of a binder and a conductive material. The active material for a negative electrode preferably includes a lithium alloy material having a high lithium storage characteristic of 700 mAh/g or more. In the case of a common carbon-based negative electrode, a potential in the full charge state is about 0 V to 0.1 V on the basis of the potential of lithium metal, and so the lithium alloy material preferably is included as the active material. In the case in which an alloy with lithium is performed up to a low full charge potential, the lithium alloy material with an electrochemical activity has a storage ability of 700 mAh/g or more. In the case in which an alloy material having a capacity lower than the storage ability of 700 mAh/g is used, it may not be easy to implement a high energy density which is intended by the present invention.

For example, one or more selected from the group consisting of Si, Sn, and Al, an alloy in which the atomic fraction of the active element(s) is 50% or more, or an oxide of them preferably is used. The negative electrode material has a higher capacity and greater initial irreversible capacity loss than a carbon-based material and it can implement the battery of a high energy density using metal lithium according to the present invention. Meanwhile, the initial irreversible capacity of the negative electrode preferably is 40% or less of the reversible capacity. If the irreversible capacity is too high, the amount of additional initial lithium supplied becomes too much and manufacture productivity can be reduced.

A metallic current collection plate, such as aluminum (Al), which is used as the positive electrode is coated with a positive electrode active material, such as a transition metal oxide not including lithium which can reversibly intercalate and deintercalate lithium, a transition metal oxide including lithium, or a mixture of them. Unlimited examples of the positive electrode active material not including lithium can include $MnO_2$, $MoO_3$, $VO_2$, $V_2O_5$, $V_6O_{13}$, $Cr_3O_8$, and $CrO_2$. Further, unlimited examples of the transition metal oxide including lithium can include a material, such as a $LiMO_2$ composition having a layered structure (where M is Co, Ni, Mn, or a mixture of them), $LiMn_2O_4$ having a spinel structure, and $LiFePO_4$ having an olivine structure.

According to the present invention, the reversible storage ability of the positive electrode is utilized 100%, and a difference between the reversible storage ability and the amount of initially included lithium is fully taken advantage of. Accordingly, in the present invention, it is preferred that a metal oxide not including lithium be used as the material for the positive electrode and the capacity thereof be higher. For example, the capacity can be 100 mAh/g to 300 mAh/g or 300 mAh/g or more.

In accordance with the present invention, the electrode is fabricated by forming the metal lithium layer on the surface of the negative electrode or the positive electrode or both. In an embodiment, when lithium is heated by supplying heat of 600° C. to metal lithium in a vacuum state of about 10 torr, lithium gas is generated. When the electrode surface coated with the active material passes through the lithium gas while the lithium gas continues to be supplied, the lithium layer is deposited on the electrode surface. The lithium layer has a thickness of about 5 to 10 μm when a total electrode thickness is about 100 μm. This corresponds to an amount which increases the capacity of 1 to 2 mA/cm². Further, it is preferred that the weight of the lithium layer be 0.3 mg/cm² to 0.8 mg/cm² per unit area. It is, however, to be noted that the deposition process conditions, the thickness and weight of the lithium layer, and the increment of the current density are only embodiments, and the present invention is not limited thereto.

As another example, there is a method of continuously coating particles, including an excess of lithium, on the electrode surface by spraying the particles on a specific binder solution and forming a lithium coating layer by continuously passing the particles through a press. Here, lithium metal powder having a surface coated with a stabilization layer can be used as the particles including an excess of lithium. What fluoro-based polymer, acryl-based polymer, SBR-based rubber, or PAN-based polymer, such as PVDF, is dispersed in a non-aqueous solvent can be used as the binder solution. A continuous coating method, such as spray, roll coating, or dip coating, can be used as the coating method.

The formation of the lithium layer can be applied to the negative electrode or the positive electrode or both. Metal lithium formed on the electrode surface is fully ionized through the step of injecting an electrolyte to the activation step and absorbed into the lithium storage materials included in the negative electrode and the positive electrode. In all the cases, metal lithium existing on the electrode surface is consumed in the activation step, and thus the metal lithium does not remain in a battery charge/discharge step. In the lithium secondary battery using the electrode of the present invention, metal lithium is fully consumed in the activation process. Accordingly, a danger of metal lithium can be avoided, and the capacity of the battery can be increased because of doped metal lithium.

The present invention provides a lithium secondary battery having a significantly increased reversible capacity after activation by assembling the electrode using a common method of assembling the lithium secondary battery.

Further, in a method of manufacturing the electrode according to the present invention, a metal foil current collector commonly used as the current collector of the electrode can be used. Accordingly, the electrode has an excellent mechanical strength. Further, in the process of fabricating the electrode, a conventional process is used without change, and the process of coating metal lithium on the electrode surface is added. Accordingly, the present invention can be easily implemented. In particular, in the case in which lithium is coated using a deposition method, the electrode of the present invention has a thickness of about 100 μm and heat can be distributed over the entire thickness. Accordingly, the deposited lithium can be effectively cooled, and metal lithium can be uniformly doped on the entire area of the electrode chemically or electrochemically through deposition.

Embodiment

The positive electrode and the negative electrode of the lithium secondary battery were fabricated using the following method.

(1) Manufacture of Negative Electrode

The negative electrode plate, including a copper (Cu) current collection plate of 10 μm in thickness and coating layers on both surfaces, was fabricated. Here, the coating layer was made of SiO having a capacity per unit weight of 1200 mAh/g and an initial irreversible capacity of 800 mAh/g, a carbon-based material having a capacity of about 300 mAh/g and an initial irreversible capacity of 30 mAh/g, a rubber component functioning as a binder, CMS, and conductive carbon acetylene black. In this case, SiO was 40%, the carbon-based material was 50%, the rubber component was 4%, CMC was 4%, and the conductive carbon acetylene black was 2%, of a total percentage of the coating layer. Further, the coating layer was controlled to have a reversible lithium storage and discharge ability of 3 mAh/cm². Next, the negative electrode plate fabricated using continuous processes was rolled, dried, and then put into a vacuum deposition chamber (pressure: 10 torr, temperature: 600° C.). Next, metal lithium having a thickness of 12 μm was deposited on the negative electrode plate at a deposition speed of 0.5 m/min, thereby forming the lithium layer.

(2) Manufacture of Positive Electrode

The positive electrode, including an aluminum (Al) current collection plate of 14 μm in thickness and a coating layer on both surfaces, was fabricated. Here, the coating layer was made of $MnO_2$ capable of storing lithium at 200 mAh/g per unit weight, $LiMn_2O_4$ having an initial discharge capacity of 115 mAh/g and a reversible lithium storage capacity of 110 mAh/g, conductive carbon acetylene black, and PVdF. In this case, $MnO_2$ was 30%, $LiMn_2O_4$ was 60%, conductive carbon acetylene black was 4%, and PVdF was 6%, of a total percentage of the coating layer. Further, the coating layer was controlled to have a reversible lithium storage and discharge ability of 3 mAh/cm².

(3) Assembly the Battery

The negative electrode, the positive electrode, a polyethylene separation layer, and an organic electrolyte including EC/DEC/an additive using $LiPF_6$ as salt were assembled to form a small-sized aluminum laminate package type cell having an electrode area of about 10 cm².

Comparison Example

A negative electrode, composed of the same composition as the negative electrode of the present embodiment and not coated with lithium, and the positive electrode of the present embodiment were assembled to form a cell for comparison using the same method as the present embodiment.

Evaluation of Capacity of Battery

The batteries fabricated according to the embodiment and the comparison example were activated and then charged and discharged in a range of 4.2 to 1.5 V.

As a result of the charge and discharge, it was found that in the battery including the electrode having the lithium layer deposited thereon according to the present embodiment, the irreversible capacity of the negative electrode was fully offset and an excessive lithium capacity was discharged as low voltage $MnO_2$ materials.

The lithium secondary battery of the present invention utilizes the lithium storage and discharge ability of materials for the negative electrode and the positive electrode included in the battery to the maximum extent. Accordingly, a reversible capacity after activation can be significantly increased. Further, since metal lithium is fully consumed during activation, a danger of metal lithium can be avoided.

While the invention has been shown and described with respect to the preferred embodiments, it will be understood by those skilled in the art that various changes and modifications may be made without departing from the spirit and scope of the invention as defined in the following claims.

What is claimed is:

1. A lithium secondary battery, comprising:
a positive electrode, a negative electrode, membranes, and electrolyte, wherein the negative electrode is made of a material which can be alloyed with lithium; the positive electrode is made of a mix of a transition metal oxide not including lithium and a transition metal oxide including lithium and configured to have an entire reversible lithium storage capacity greater than a lithium capacity dischargeable from the positive electrode; and a lithium layer formed directly on a surface of the negative electrode or directly on a surface of both the negative electrode and the positive electrode upon initial activation and charging of the lithium secondary battery satisfies the Equation $$S < L \leq S + I$$

where S=a lithium storage capacity of the positive electrode−a capacity of lithium initially included in the positive electrode, L is an amount of lithium within the lithium layer, and I is an initial irreversible consumption capacity in the negative electrode, wherein, upon initial activation and charging, lithium in metal form does not remain on the surface of the positive and negative electrode,
wherein the material of the negative electrode has a capacity per unit weight of 700 mAh/g to 4300 mAh/g and can be alloyed with lithium, and
wherein an initial irreversible capacity of the negative electrode is 40% or less of a reversible capacity.

2. The lithium secondary battery of claim 1, wherein the lithium layer is one selected from a group comprising a lithium metal foil, a lithium metal depositing layer, or a mixed layer of metal lithium and binder polymer.

3. The lithium secondary battery of claim 1, wherein the lithium layer has weight per unit area is 0.3 mg/cm$^2$ to 0.8 mg/cm$^2$.

4. The lithium secondary battery of claim 1, wherein the material which can be alloyed with lithium includes one or more selected from a group comprising Si, Sn, and Al; an alloy in which the atomic fraction of the element(s) is 50% or more; or an oxide of them.

5. The lithium secondary battery of claim 1, wherein the transition metal oxide not including lithium includes one or more selected from a group comprising $MnO_2$, $MoO_3$, $VO_2$, $V_2O_5$, $V_6O_{13}$, $Cr_3O_8$, and $CrO_2$, and the transition metal oxide including lithium includes one or more selected from a group comprising $LiMO_2$ having a layered structure, where M is Co, Ni, Mn, or a mixture thereof, $LiMn_2O_4$ having a spinel structure, and $LiFePO_4$ having an olivine structure.

6. The lithium secondary battery of claim 1, wherein the lithium layer coated directly on the negative electrode is the only layer coated on the negative electrode.

7. The lithium secondary battery of claim 1, wherein the lithium layer coated directly on the negative electrode has a thickness of 12 μm.

8. The lithium secondary battery of claim 1, wherein the lithium layer coated directly on the negative electrode is deposited at a deposition speed of 0.5 m/min.

9. The lithium secondary battery of claim 1, wherein the lithium layer coated directly on the negative electrode increases discharge capacity of the battery from 50% to over 100% after the battery is activated and then charged and discharged in a range of 4.2 to 1.5 V.

* * * * *